United States Patent [19]

Guida et al.

[11] 4,443,919

[45] Apr. 24, 1984

[54] METHODS FOR SETTING STONES AND TOOLS FOR PERFORMING SUCH METHODS

[75] Inventors: Frank Guida; Bernice Guida, both of 11755 7th St. East, Treasure Island, Fla. 33707

[73] Assignees: Michael Colello; Joseph Colello, both of Springfield, N.J.; Frank Guida; Bernice Guida, both of Treasure Island, Fla. ; a part interest

[21] Appl. No.: 290,373

[22] Filed: Aug. 5, 1981

[51] Int. Cl.³ .............................................. B23P 5/00
[52] U.S. Cl. ....................................... 29/10; 29/160.6
[58] Field of Search ......................... 29/10, 525, 160.6

[56] References Cited

U.S. PATENT DOCUMENTS

| 495,325 | 4/1893 | Girdany | 29/10 |
|---|---|---|---|
| 1,499,818 | 7/1924 | Franconetti | 29/10 |
| 1,501,616 | 7/1924 | Ogush | 29/10 |
| 2,610,385 | 9/1952 | Manne | 29/10 |
| 2,753,618 | 7/1956 | Stanziale | 29/10 |
| 3,435,513 | 4/1969 | Knittweis | 29/10 |
| 3,548,471 | 6/1968 | Biller | 29/10 |
| 3,751,795 | 8/1973 | Favre | 29/10 |
| 4,258,458 | 3/1981 | Danna | 29/10 |
| 4,292,818 | 10/1981 | Vitan | 29/10 |

FOREIGN PATENT DOCUMENTS 192892 12/1937 Sweden .................................. 29/10

*Primary Examiner*—Frank T. Yost
*Assistant Examiner*—Paul M. Heyrana, Sr.
*Attorney, Agent, or Firm*—Pugh, Martha G.

[57] ABSTRACT

Tools for setting precious and semi-precious stones in metal, and methods for using such tools to set such stones quickly and to accomplish such setting in the absence of chisel marks in the finished products. A first tool includes a disc-shaped rotating grinding member that has a beveled cutting edge for trimming excess metal prior to making the setting. A second tool has a disc-shaped rotatable cutting member having a kerfed cutting edge that produces parallel channels in such metal to thereby define a linear bar means therebetween which bar is manipulated by a conventional tool to form beads that retain the stones within their respective settings. The inventive method contemplates the use of the beveled edge tool to form beveled reflective surfaces on opposite sides of the stone, and use of the kerfed-edge tool thereafter to form the bead-producing bars. An alternative method contemplates using the kerfed edge tool first, followed by the beveled edge tool. In both methods, the preparatory steps are performed before the stones are set in their respective mounting holes.

4 Claims, 22 Drawing Figures

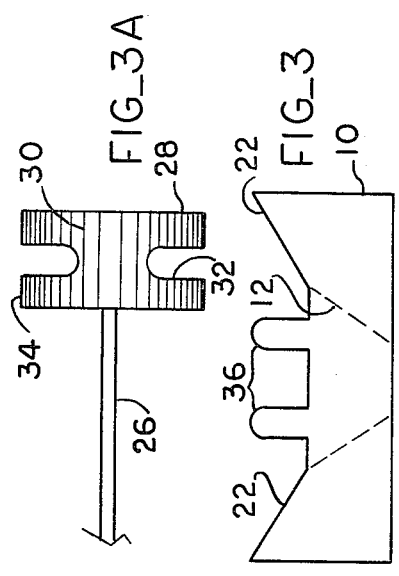
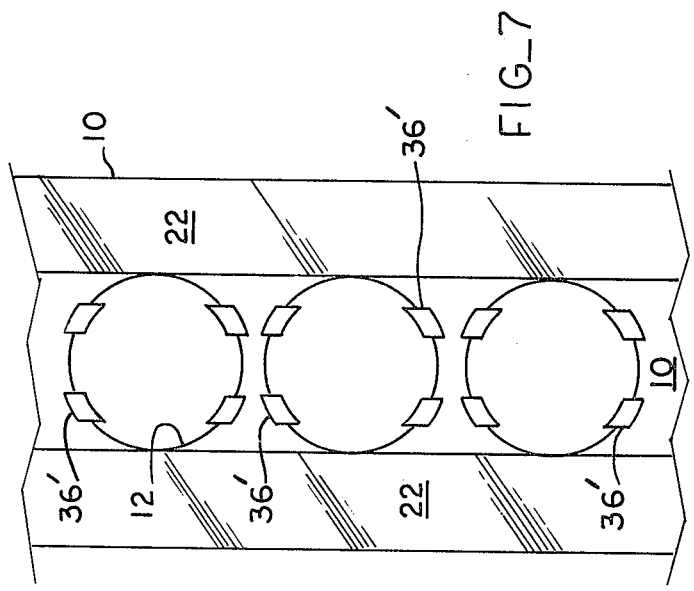
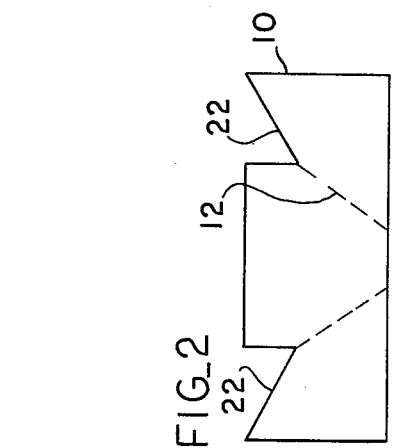
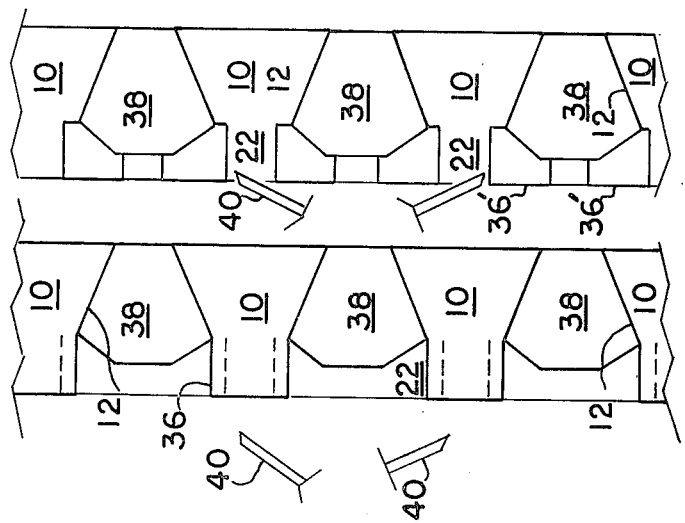
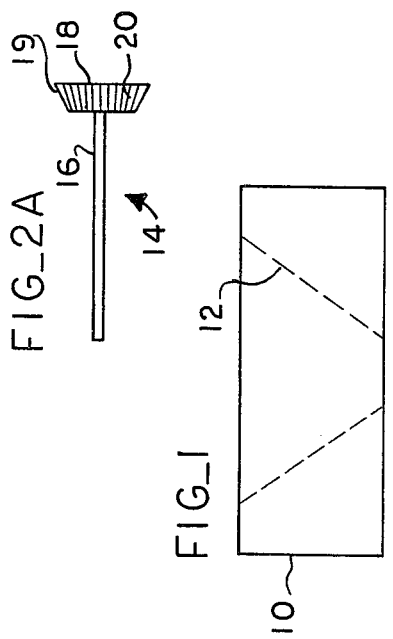
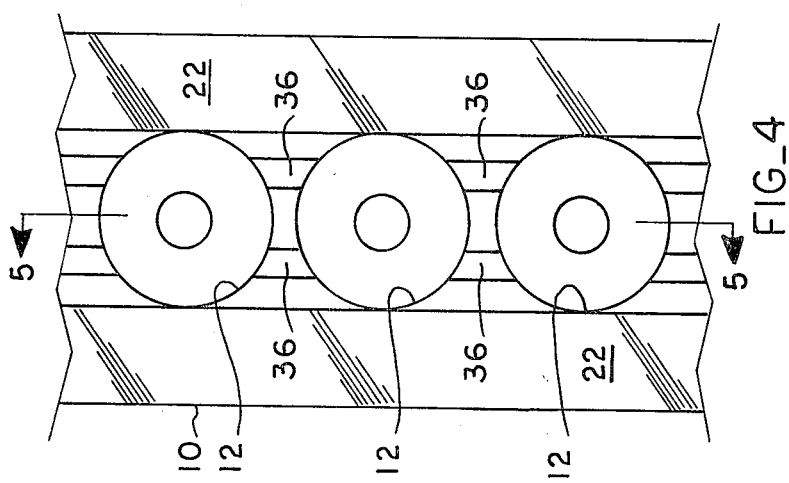

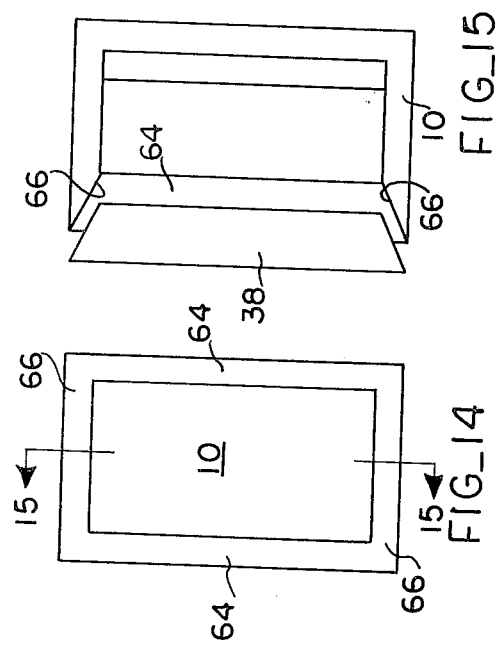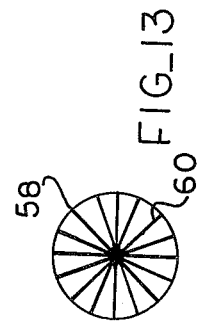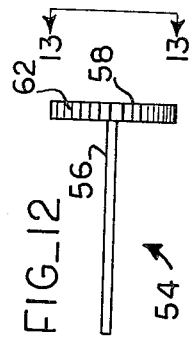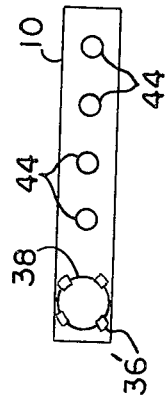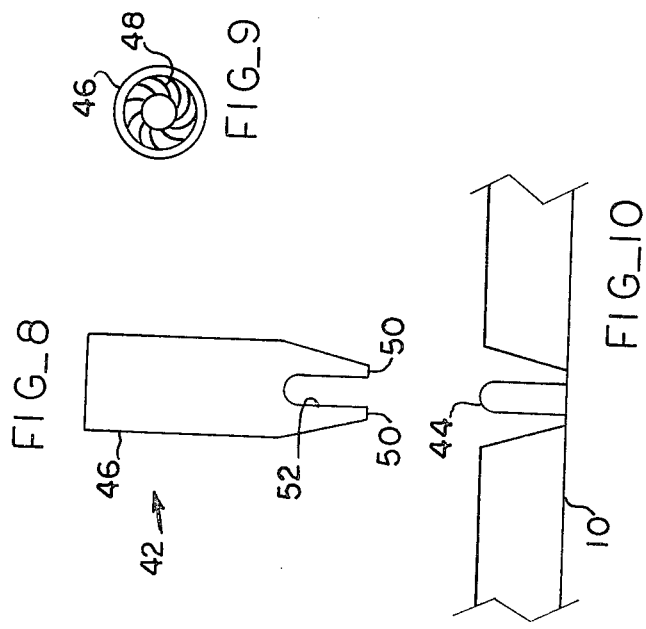

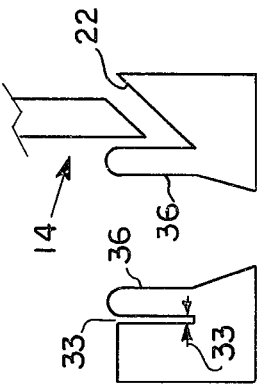
FIG_16
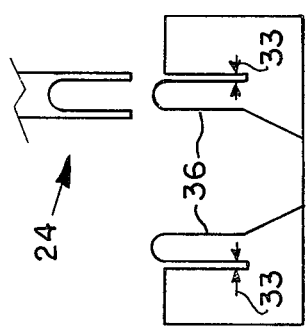
FIG_17
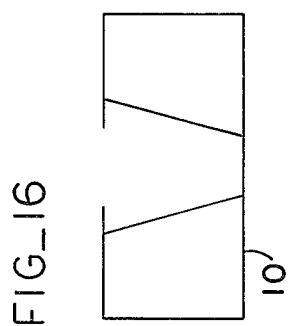
FIG_18
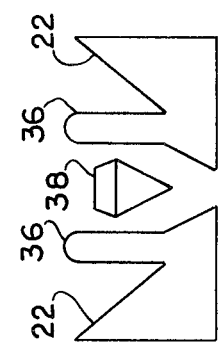
FIG_19
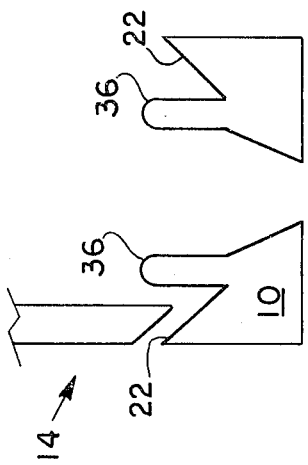
FIG_20

METHODS FOR SETTING STONES AND TOOLS FOR PERFORMING SUCH METHODS

BACKGROUND OF THE INVENTION

1. Field of the Invention

This invention relates generally to tools useful in the stone setting service, and further relates to methods for using such tools whereby the skill required to produce highly professional work is substantially reduced.

2. Description of the Prior Art

There are two standard methods employed by artisans in the stone setting trade for setting precious stones in metal. The first method is known as the European method and includes chiseling excess metal from the border of the metal into which the stone or stones are to be set, followed by setting the stones into their respective mounting holes, and by forming stone-retaining beads by exerting metal-deforming pressure with an engraver's tool on the metal immediately surrounding the individual stones.

The second, or American method, calls for trimming the excess border metal with the stones already set in their respective mounting holes, followed by securing the stones by the European beading method. Although the American method provides a method whereby stones can be set quickly, it should be noted that the practice of trimming metal with the stones already in place can result in an inadequate or unattractive trimming relative to the quality of trim that can be achieved by following the European method of trimming with the stones not yet disposed within their respective mounting holes.

Both the European and American methods are time-consuming and require a high level of skill. Even the most skilled artisans may produce finished products the beauty of which is marred by chisel markings. Furthermore, many retail jewelry stores employ stone setters lacking in the considerable skill required to produce customer-pleasing settings, with the result that customers may be lost to competing stores that employ, at higher saleries, more qualified artisans. The increased operating costs of such stores is of course paid by their customers.

Accordingly, there is a need in the stone setting trade for tools which reduce the level of skill required to produce professionally crafted stone settings, and for methods wherein such tools can be employed optimally. Such a need, if fulfilled, would provide higher quality service to consumers, while reducing the cost of such quality.

The prior art is lacking in such tools and techniques.

SUMMARY OF THE INVENTION

The longstanding but heretofore unfulfilled need for tools which could allow artisans to perform higher quality work in less time is now fulfilled by two tools, both of which include rotating cutting heads mounted on the distal free end of and conjointly rotatable with a rotating shaft that is driven by a conventional dental-type instrument. The respective cutting heads are orthogonally disposed relative to the rotating shaft.

The first tool has a disc-shaped cutting head with a beveled annular cutting edge having a plurality of equidistantly spaced radial teeth that are mutually parallel but disposed obliquely to the axis of rotation of the cutting head. Use of this tool allows metal to be trimmed from the mounting hole or holes all the way to the edge thereof, and the resulting trim provides the appearance of a die struck trim, since it is entirely lacking in chisel marks.

The second tool has a disc-shaped cutting head having a kerfed annular edge so that attacking the metal such tool produces a bar-like strip of metal between the channels cut by the cutting edges on opposite sides of the kerf. This bar is then easily manipulated to form stone-retaining beads, thereby greatly reducing the effort required to form such beads by digging into the metal with an engraver's tool, as is practiced in both the European and American methods of the prior art.

It is therefore clear that the primary object of this invention is to advance the stone setting art by providing tools which produce work that appears to be die struck. whereby stones may be set with a minimum of effort.

Still another object is to provide tools that reduce the level of skill required to set stones, so that such service may be provided at lower cost to the public without sacrificing quality and indeed while enhancing such quality.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which:

FIG. 1 is an end view of a piece of metal into which a plurality of stones is to be set in linear array, the mounting holes for such stones shown in phantom lines.

FIG. 2 is an end view of the same piece of metal after the first inventive tool has been employed to form opposed reflected surfaces therein.

FIG. 2A is a side elevational view of the first inventive tool.

FIG. 3 is an end view of the same piece of metal after the second inventive tool has been employed to form parallel bar members between the opposed reflective surfaces, in parallel alignment therewith.

FIG. 3A is an enlarged, partially broken away side elevational view of the second inventive tool.

FIG. 4 is a top plan view of the piece of metal shown in FIG. 3.

FIG. 5 is a longitudinal cross sectional view taken along line 5—5 of FIG. 4, showing stones disposed within therein respective mounting holes.

FIG. 6 is the same view as shown in FIG. 5, showing the bar members broken to secure the stones against removal from the mounting holes.

FIG. 7 is a top plan view of the same piece of metal depicted in FIG. 6, showing how the broken bar members provide beads to secure the stones against removal.

FIG. 8 is a side elevational view of the third inventive tool.

FIG. 9 is a bottom plan view of the third inventive tool.

FIG. 10 is a side elevational view of a piece of metal having a bead formed therein by the third inventive tool.

FIG. 11 is a top plan view of a piece of metal having a plurality of beads formed therein by the third inventive tool.

FIG. 12 is a side elevational view of the fourth inventive tool.

FIG. 13 is taken along line 13—13 of FIG. 12.

FIG. 14 is a top plan view of a piece of metal of the type provided to receive bagettes therein.

FIG. 15 is a longitudinal cross sectional view taken along line 15—15 of FIG. 14.

FIG. 16 is an end view of a metallic block after it has been drilled and stone fitted.

FIG. 17 is an end view of the block shown in FIG. 16 after the same has been abraded by the bar-forming tool.

FIG. 18 is an end view of the block shown in FIG. 17 showing the reflective surface-forming tool and the first reflective surface formed by it.

FIG. 19 is an end view of the block shown in FIG. 18 showing the reflective surface-forming tool and the second reflective surface formed by it.

FIG. 20 is an end view of the block shown in FIG. 19 showing the insertion of the stone to be set within said block.

DETAILED DESCRIPTION OF THE PREFERRED EMBODIMENT

The novel tools will be shown and described in connection with a job requiring the setting of precious or semi-precious stones in a metal, such as gold or silver, in linear alignment with respect to one another. For illustrative purpose, the metal will be shown as a rectangular bar, designated 10 in the drawings, and a single row of mounting holes, collectively designated 12, will be shown, it being understood that such mounting holes 12 are formed by conventional burring techniques.

FIG. 1 shows the metal 10 prior to any manipulation thereof, and the mounting holes are represented by phantom lines and designated 12, as aforesaid.

The first inventive tool is shown in FIG. 2A, and is generally designated 14. The tool 14 includes a rotatable shaft 16 and a disc-shaped head portion 18 fixedly secured thereto. The annular marginal edge of the head portion 18 is beveled as at 19, and includes a plurality of teeth 20 formed therein that are obliquely disposed, as shown, relative to the rotational axis of the shaft 16.

A dental-type apparatus (not shown) is employed to impart rotation to the shaft 16 and hence to the head 18, and the tool 14 is used to form opposed reflective surfaces 22, 22 on the metal 10, as shown in FIG. 2. Surfaces 22, 22 serve to enhance the aesthetic appeal of the stones to be set in the respective mounting holes 12. As perhaps best shown in FIG. 4, the reflective surfaces 22, 22 extend to the periphery of the mounting holes 12.

The second inventive tool is shown in FIG. 3A in enlarged form for illustrative purposes and is generally designated 24. The tool 24 includes a rotatable shaft 26 and a conjointly rotatable head portion 28 having a plurality of teeth 30 formed therein, said teeth 30 being disposed parallel to the axis of rotation of the shaft 26. A groove or channel 32 is formed in the annular marginal edge 34 of the head 28, and produces a complementally formed bar 36 when the head 28 attacks and abrades the metal 10 as suggested by the representations of FIGS. 3 and 3A when considered together. As shown in FIG. 3, two (2) bars 36 are preferably formed by tool 24 when a linearly aligned row of stones is to be mounted, as will become clear as this description proceeds. A comparison of FIGS. 2, 3, and 3A shows how the tool 24 affects the shape of the metal 10.

At this point of the inventive method, the bars 36 will appear as shown in FIG. 4, i.e., the bars 36 will extend between adjacent mounting holes 12. It is important to note that the stones to be mounted are not disposed in their respective holes 12 at this point.

FIG. 5, taken along line 5—5 of FIG. 4, shows the respective stones, collectively designated 38, properly seated within their holes 12. As clearly shown in FIG. 5, the bars 36 are serving no purpose at this point.

An engraver's flat tool, one of which is shown in FIG. 5 and designated 40, and fragments of which are also shown in FIGS. 5 and 6, is employed to break the bars 36 to form beads 36' that serve to hold the stones 38 within their respective mounting holes 12, as shown schematically in FIG. 6. In FIGS. 5 and 6, the size of the bars 36 and the beads 36' formed therefrom are greatly exagerated with respect to the size of the stones 38, for illustrative purposes, it being understood that the stones 38 are not substantially obscured by the beads 36' when the inventive method is performed, although such would appear to be the case in FIG. 6.

The final product will appear as shown in FIG. 7. It will now be understood that tool 14 obviates the need for a chisel to produce the reflective surfaces 22, 22, provides a product having the appearance of a die-struck product, and allows the artisan to bring the reflective surfaces 22, 22 to the very edge of the mounting holes 12, thereby eliminating all excess metal. Moreover, it will now be understood that tool 24 eases the beading process by providing the bars 36 which essentially are weakening lines, and which therefore greatly reduce the effort required to form the beads 36'.

FIGS. 8, 9, and 10 show another novel tool 42 that may be used to form beads 44 shown in FIG. 10. The bead cutter 42 preferably has a 3/32nd inch in diameter rotatable shaft 46 which is preferably about 2½ inches in length. Spiral teeth 48, as shown in FIG. 9, are formed in the cutting edge 50 of the tool 42 and are disposed in toroidal configuration. A channel 52 is formed in the tool and provides complementally formed beads 44 as is clearly suggested by a comparison of FIGS. 8 and 10. FIG. 11 shows a piece of metal 10 having a stone 38 seated therein and a plurality of beads 44 formed therein by tool 42.

The final inventive tool has application in the setting of Bagettes or square cut diamonds or semi-precious stones, and is generally designated 54 in FIG. 12. The tool 54 has a rotatable shaft 56 and a conjointly rotatable cutting head 58 integrally formed therewith. as shown in FIG. 13, the head 58 has radial teeth 60 on its face, and FIG. 12 shows that the annular marginal edge of the head 58 has teeth 62 disposed parallel to the axis of rotation of the shaft 56. FIGS. 14 and 15 show how the tool 54 is used. Sidewalls 64 are beveled by the teeth 60 on the face of the head 58, and sidewalls 66 are beveled by the teeth 62 on the annular marginal edge of the head 58. The use of this novel tool permits high tolerance seating of the Bagette so that the Bagette will be securely seated and retained within the metal 10 upon burnishing.

An alternative procedure allows the artisan to use the bar-forming tool 24 before the reflective surface-forming tool 14 is used. The alternative procedure is depicted in FIGS. 16–20. FIG. 16 shows the metallic block 10 in end view, after it has been drilled and stone fitted. FIG. 17 shows that the tool 24 can now be used to form the bars 36 before the reflective surfaces 22, 22 are formed by the tool 14. FIG. 18 and 19 show how the reflective surfaces 22, 22 are then formed with tool 14, and FIG. 20 depicts the placing of the stone in the readied mounting hole 12, just before the bars 36 are bent over to retain the stone in its desired position.

The use of tool 24 to form the bars 36 initially makes it easier to use tool 14 thereafter, as should be apparent upon inspection of FIGS. 17 and 18. The space 33 made by tool 24 eases the task of trimming the reflective surfaces 22, 22 all the way to the foot region of the respective bars 36 as is clearly shown in FIGS. 18 and 19.

It will thus be seen that the objects set forth above, and those made apparent by the preceding description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, we claim:

1. A method of setting stones in a metallic base means, comprising the steps of,
    providing a base means in the form of a generally rectangular in cross section base member and having a predetermined uniform thickness along its length,
    forming a plurality of at least two longitudinally spaced, laterally aligned stone mounting holes of uniform dimensions in said base member, centrally thereof, said mounting holes extending completely through said base member from a top surface thereof to a bottom surface thereof,
    and cutting the top surface of said base member along its length to form a pair of transversely spaced reflecting surfaces that are beveled outwardly relative to one another, thereby defining an elongate unabraded medial or table portion therebetween within which said mounting holes are formed,
    cutting said medial portion of said base member to form a transversely spaced pair of substantially parallel, discontinuous bar means formed integrally with said base member top surface and projecting upwardly therefrom,
    setting a stone within each of said mounting holes after said forming of said bar means,
    and securing said stones within their respective mounting holes by manually deforming said bar means such that the portion of each segment of said bar means contiguous to a stone overlies the peripheral margin of its associated stone.

2. The method of claim 1, wherein the step of forming said discontinuous bar means includes the step of cutting said medial portion of said base member to form said discontinuous bar means so that their respective heights are substantially equal to the height of said medial portion prior to such cutting.

3. The method of claim 1, wherein the step of cutting said medial portion of said base member to form said discontinuous bar means further includes the step of cutting said medial portion so that the respective bar means are equidistantly spaced relative to a longitudinal axis of symmetry of the metallic base means within which said stones are set.

4. The method of claim 1, wherein the step of manually deforming said bar means includes the step of breaking each bar means at its midlength region and by urging opposite halves of said bar means in opposite directions relative to one another.

* * * * *